(12) United States Patent
Lee et al.

(10) Patent No.: US 8,776,141 B2
(45) Date of Patent: Jul. 8, 2014

(54) SEARCHING METHOD AND MOBILE DEVICE USING THE METHOD

(75) Inventors: Eunjung Lee, Seoul (KR); Sangyun Lee, Seoul (KR); Haejin Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 26 days.

(21) Appl. No.: 13/527,957

(22) Filed: Jun. 20, 2012

(65) Prior Publication Data

US 2013/0104172 A1    Apr. 25, 2013

(30) Foreign Application Priority Data

Oct. 24, 2011  (KR) .................. 10-2011-0108990

(51) Int. Cl.
*G06F 3/00* (2006.01)
*G06F 13/00* (2006.01)
*H04N 5/445* (2011.01)
*H04N 7/173* (2011.01)

(52) U.S. Cl.
USPC ............. 725/60; 725/37; 725/109; 725/133

(58) Field of Classification Search
USPC ........ 725/37, 60, 85, 105, 109, 110, 131, 133
See application file for complete search history.

(56) References Cited

U.S. PATENT DOCUMENTS

| | | | |
|---|---|---|---|
| 8,407,744 B2* | 3/2013 | Moon et al. ............ | 725/60 |
| 2008/0066129 A1* | 3/2008 | Katcher et al. ........... | 725/109 |
| 2009/0320070 A1* | 12/2009 | Inoguchi ................ | 725/40 |
| 2009/0327894 A1* | 12/2009 | Rakib et al. ............ | 715/719 |
| 2012/0291073 A1* | 11/2012 | Friedman ............... | 725/62 |
| 2014/0033239 A1* | 1/2014 | Wang et al. ............. | 725/13 |

\* cited by examiner

*Primary Examiner* — John Schnurr
(74) *Attorney, Agent, or Firm* — Birch, Stewart, Kolasch & Birch, LLP (57) ABSTRACT

A method of controlling a mobile device and which includes wirelessly communicating, via a wireless communication unit of the mobile terminal, with an external reproduction device reproducing content on a display of the reproduction device; inputting, via an input unit of the mobile terminal, a search request requesting information about at least one item identifiable in the reproducing content; searching, via a controller of the mobile terminal, the information about said at least one item; and displaying, on a display unit of the mobile terminal, the information found during the search.

12 Claims, 8 Drawing Sheets

SEARCHING METHOD AND MOBILE DEVICE USING THE METHOD

CROSS REFERENCE TO A RELATED APPLICATION

Pursuant to 35 U.S.C. §119(a), this application claims the benefit of Korean Application No. 10-2011-0108990, filed on Oct. 24, 2011, the contents of which is incorporated by reference herein in its entirety.

BACKGROUND OF THE INVENTION

1. Field of the Invention

The present invention relates to a search method using a mobile device for an object contained in contents and the mobile device employing the same.

2. Description of the Related Art

In recent years, as smart TVs are widely available for general users, the users can search necessary information using TV even without using a separate device such as PC. In particular, when the user wants to find information on a predetermined object being displayed on the screen while viewing TV, he or she can search information on an object desired to be searched using the TV.

However, if one user searches information using the TV while multiple people are viewing TV, then the rest of the people excluding the user will be disturbed while viewing TV. Accordingly, even if the search function is included in a smart TV, the use of the function is limited.

On the other hand, mobile devices widely available in recent years may be configured to perform various functions. The examples of such various functions may include a data and voice communication function, a function of capturing still or moving images through a camera, a voice storage function, a function of playing music files through a speaker system, an image or video display function, and the like. Some mobile devices may include an additional function capable of implementing games, and some other mobile devices may be implemented as a multimedia player. Moreover, recent mobile devices may receive broadcast or multicast signals, thereby allowing a user to view video or television programs.

Furthermore, efforts for supporting and enhancing the functions of the mobile device have been continued. The foregoing efforts may include the improvement of software and hardware as well as the change or improvement of structural elements constituting a mobile device.

Accordingly, the method of solving the foregoing problem using the mobile device will be required to be introduced since the search function is limited in a smart TV while multiple persons are viewing TV.

In particular, as mobile devices are widely available for general users in recent years, the rate of using a mobile device while viewing TV or the like has increased. Furthermore, when the user uses a mobile device while viewing TV or the like, there are frequent occasions when the user searches a place, a figure, an object, and the like, being displayed on the TV screen. However, this instance may cause difficulties for the user that he or she directly enters such a keyword. Furthermore, there is a problem that the search function is limited when the user is not familiar with a keyword.

As a result, the method of easily searching an object being displayed on the TV screen using a mobile device will be required to be introduced.

SUMMARY OF THE INVENTION

Accordingly, an object of the present disclosure is to provide schemes for solving the foregoing problems.

More specifically, another object of the present disclosure is to provide a scheme for searching an object being displayed on a TV screen while not disturbing TV viewing of other TV viewers.

Furthermore, still another object of the present disclosure is to provide a scheme for facilitating a search for an object being displayed on the TV screen using a mobile device.

According to an aspect of the present invention, there is provided a method of a search method using a mobile device, and the method may include receiving information on a content from an external image device based on a search request for the content being reproduced in the external image device, acquiring a search result based on the information of the content, and displaying at least one of the acquired search result and the information on the content on a display unit of the mobile device.

According to another aspect of the present invention, the method may be characterized in that the search request includes timing information at which the search request is input.

According to still another aspect of the present invention, the method may be characterized in that the information on the content comprises at least one of an image during a regular time interval prior to and subsequent to the timing, an object contained in the image, and meta data.

According to still another aspect of the present invention, the method may be characterized in that the information on the content includes a sound being reproduced during a regular time interval prior to and subsequent to the timing.

According to still another aspect of the present invention, the method may be characterized in that said acquiring a search result further includes receiving a search result of the information on the content performed by the image device from the image device.

According to still another aspect of the present invention, the method may be characterized in that the information on the content and the search result are received at the same time.

According to still another aspect of the present invention, the method may be characterized in that said acquiring a search result further includes searching the information on the content.

According to still another aspect of the present invention, the method may be characterized in that the sound is displayed in an icon format.

According to still another aspect of the present invention, the method may be characterized in that said displaying step further includes displaying information on a content, selecting at least one of the information on the content, and displaying a search result of the selected information based on the selection.

According to still another aspect of the present invention, the method may be characterized in that said displaying step further includes displaying a search result associated with the object when the information on the content comprises a preset object.

According to an aspect of the present invention, there is provided a mobile device, and the mobile device may include a display unit configured to display at least one object, and a controller configured to control to receive information on a content from an external image device based on a search request for the content being reproduced in the external image device, acquire a search result based on the information of the content, and display at least one of the acquired search result and the information on the content on a display unit of the mobile device.

The foregoing problems of the related art will be solved by disclosing the present disclosure.

More specifically, a scheme for searching an object being displayed on a TV screen while not disturbing TV viewing of other TV viewers will be provided to the user by disclosing the present disclosure.

Furthermore, a scheme for facilitating a search for an object being displayed on the TV screen using a mobile device will be provided to the user by disclosing the present disclosure.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

A suffix "module", "unit", or "portion" used for constituent elements disclosed in the present disclosure is merely intended for easy description of the specification, and the suffix itself does not give any special meaning or function.

The terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments according to the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Figure 1:
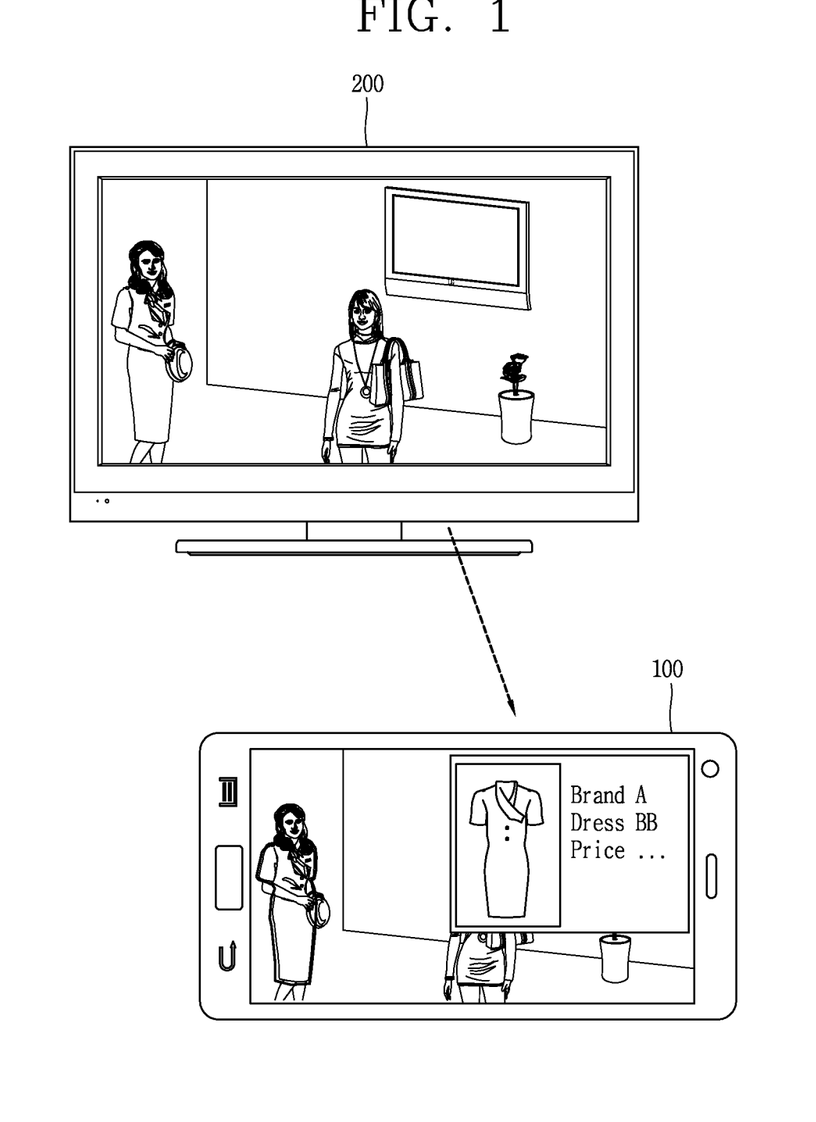
FIG. 1 is a view illustrating a search method using a mobile device for a content being reproduced in an external image device.

FIG. 1 is a view illustrating a search method using a mobile device 100 for a content being reproduced in an external image device 200. As illustrated in FIG. 1, an object included in a content being reproduced in the external image device 200 can be searched by using the mobile device 100.

A mobile device disclosed herein includes a portable phone, a smart phone, a laptop computer, a digital broadcast mobile device, a personal digital assistant (PDA), a portable multimedia player (PMP), a navigation, and the like. Furthermore, the image device 200 described in the present disclosure includes a smart TV, a digital TV, a desktop computer, and the like.

On the other hand, the object may include a figure, a place, a text, an animal or plant, an item, a trademark, and the like. Furthermore, the object may include a sound or the like contained in the content. Also, the content may include a TV program, a movie, a video, and the like.

The image device 200 and mobile device 100 include a wireless communication unit, a short-range communication module, and the like, to perform connection or data transmission to another device. The wireless communication unit can allow radio communication between a device and a wireless communication system or between a device and a network in which the device is located. The short-range communication module represents a module for short-range communication. The short-range communication technologies including Bluetooth, Radio Frequency Identification (RFID), Infrared Data Association (IrDA), Ultra WideBand (UWB), ZigBee, and the like may be used.

In other words, the mobile device 100 can transmit and/or receive data to and/or from the image device 200 using the wireless communication unit, short-range communication module, and the like. Furthermore, the controller of the image device 200 and mobile device 100 can detect an object from a content being reproduced by the image device 200 or mobile device 100.

Also, the controller of the image device 200 and mobile device 100 can search information on the detected object. For instance, the controller can search the information on the object through information search sites to acquire the result.

Figure 2:
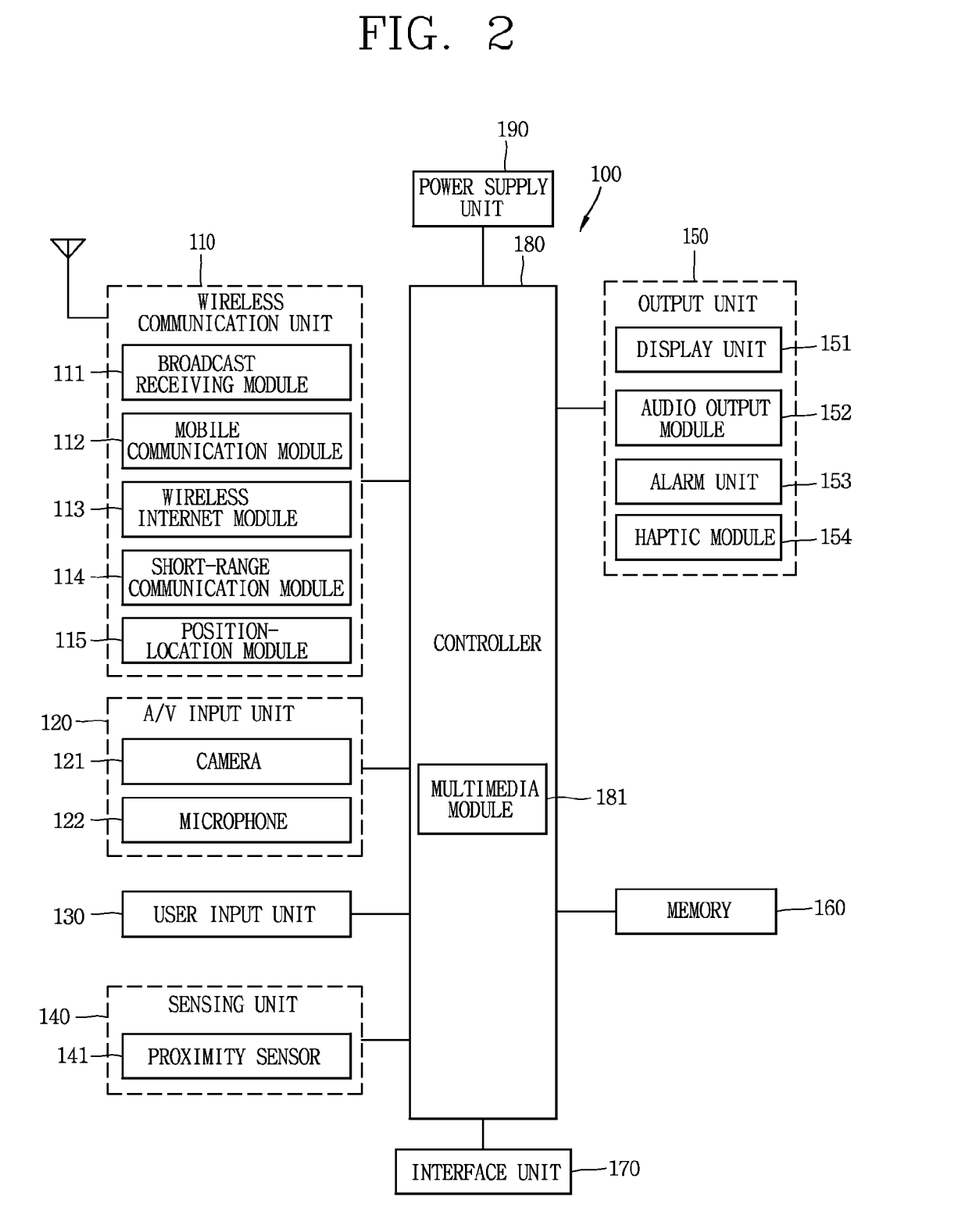
FIG. 2 is a block diagram illustrating an mobile device according to an embodiment disclosed herein.

Hereinafter, the constituent elements of the mobile device 100 to be used according to an embodiment of the present invention will be described in detail. In particular, FIG. 2 is a block diagram illustrating the mobile device 100 according to an embodiment disclosed herein. Further, a configuration according to an embodiment disclosed herein may be applicable to an image device, and the like, excluding constituent elements particularly applicable to the mobile device 100.

As shown in the example of FIG. 2, the mobile device 100 includes a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile device may be implemented with greater or less number of elements than those illustrated elements.

The wireless communication unit 110 generally includes one or more elements allowing radio communication between the mobile device 100 and a wireless communication system, or allowing radio communication between the mobile device 100 and a network in which the mobile device 100 is located. For example, in FIG. 1 the wireless communication unit 110 includes a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile device 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems. The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The mobile communication module 112 may be configured to implement a video communication mode and a voice communication mode. The video communication mode refers to a configuration in which communication is made while viewing an image of the counterpart, and the voice communication mode refers to a configuration in which communication is made without viewing an image of the counterpart. The mobile communication module 112 may also be configured to transmit or receive at least one of voice or image data to implement the video communication mode and voice communication mode.

The wireless Internet module 113 corresponds to a module for supporting wireless Internet access. The wireless Internet module 113 may be built-in or externally installed to the mobile device 100. Here, a wireless Internet access technique including a WLAN (Wireless LAN), Wi-Fi, Wibro (Wireless Broadband), Wimax (World Interoperability for Microwave Access), HSDPA (High Speed Downlink Packet Access), and the like can be used.

The short-range communication module 114 is a module for supporting a short-range communication. Here, a short-range communication technology including Bluetooth, Radio Frequency IDentification (RFID), Infrared Data Association (IrDA), Ultra WideBand (UWB), ZigBee, and the like can be used.

In addition, the location information module 115 is a module for checking or acquiring a location of the mobile device, and there is a GPS module as a representative example.

Referring to FIG. 2, the A/V (audio/video) input unit 120 receives an audio or video signal, and the A/V (audio/video) input unit 120 may include a camera 121 and a microphone 122. The camera 121 processes a image frame, such as still picture or video, obtained by an image sensor in a video phone call or image capturing mode. The processed image frame can then be displayed on a display unit 151.

The image frames processed by the camera 121 may be stored in the memory 160 or transmitted to an external device through the wireless communication unit 110. Two or more cameras 121 may be provided according to the use environment of the mobile device.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile device 100 such as an opened or closed state of the mobile device 100, a location of the mobile device 100, an orientation of the mobile device 100, and the like, and generates a sensing signal for controlling the operation of the mobile device 100. For example, when the mobile device 100 is a slide phone type, it can sense an opened or closed state of the slide phone. Furthermore, the sensing unit 140 takes charge of a sensing function associated with whether or not power is supplied from the power supply unit 190, or whether or not an external device is coupled to the interface unit 170.

The output unit 150 is configured to provide an output for audio signal, video signal, or alarm signal, and the output unit 150 includes the display unit 151, an audio output module 152, an alarm unit 153, a haptic module 154, and the like.

The display unit 151 may display (output) information processed in the mobile device 100. For example, when the mobile device 100 is in a phone call mode, the display unit 151 can display a User Interface (UI) or a Graphic User Interface (GUI) associated with a call. When the mobile device 100 is in a video call mode or image capturing mode, the display unit 151 can display a captured image and/or received image, a UI or GUI. Also, the display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a mobile device body through a region occupied by the display unit 151 of the mobile device body.

Two or more display units 151 may also be implemented according to a configured aspect of the mobile device 100. For instance, a plurality of the display units 151 may be arranged on one surface to be spaced apart from or integrated with each other, or may be arranged on different surfaces.

When the display unit 151 and a touch sensitive sensor (hereinafter, referred to as a "touch sensor") have an interlayer structure (hereinafter, referred to as a "touch screen"), the display unit 151 can be used as an input device rather than an output device. The touch sensor may be implemented as a touch film, a touch sheet, a touch pad, and the like.

The touch sensor can be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When there is a touch input to the touch sensor, the corresponding signal(s) are transmitted to a touch controller. The touch controller processes the received signal(s), and then transmits corresponding data to the controller 180. Accordingly, the controller 180 may sense which region of the display unit 151 has been touched.

Referring to FIG. 2, a proximity sensor 141 may be arranged at an inner region of the mobile device 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as "proximity touch", whereas a status that the pointer substantially comes in contact with the touch screen will be referred to as "contact touch". For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile device 100, e.g., sound alarming a call received or a message received, and so on. The audio output module 152 may include a receiver, a speaker, a buzzer, and so on.

The alarm 153 outputs signals notifying occurrence of events from the mobile device 100. The events occurring from the mobile device 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 154 may be implemented in two or more in number according to the configuration of the mobile device 100.

The memory 160 may store a program for processing and controlling the controller 180. Alternatively, the memory 160 may temporarily store input/output data (e.g., phonebooks, messages, still or moving images, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile device 100 may operate a web storage which performs the storage function of the memory 160 on the Internet.

The interface unit 170 may generally be implemented to interface the mobile device with external devices. The interface unit 170 may allow a data reception from an external device, a power delivery to each component in the mobile device 100, or a data transmission from the mobile device 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile device 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile device 100 via a port.

The interface unit 170 may serve as a path for power to be supplied from an external cradle to the mobile device 100 when the mobile device 100 is connected to the external cradle or as a path for transferring various command signals inputted from the cradle by a user to the mobile device 100. Such various command signals or power inputted from the cradle may operate as signals for recognizing that the mobile device has accurately been mounted to the cradle.

The controller 180 typically controls the overall operations of the mobile device 100. For example, the controller 180 performs the control and processing associated with telephony calls, data communications, video calls, and the like. Furthermore, the controller 180 may include a multimedia module 181 which provides multimedia playback. The multimedia module 181 may be configured as part of the controller 180 or as a separate component.

Furthermore, the controller 180 may capture an image being displayed on the display unit 151 to store it in the memory 160. Furthermore, the controller 180 may capture a sound being output from the audio output module 152 to store it in the memory 160. The controller 180 can also detect an object contained in an image being displayed on the display unit 151, control information on the detected object to be searched through the Internet, and store the searched result in the memory 160. Also, the controller 180 can detect data corresponding to the object selected by the user among at least one or more objects being displayed on the display unit 151.

Hereinafter, referring to FIG. 3, the detailed embodiment of a search process using a mobile device for a content being reproduced in an external image device will be described. In particular, FIG. 3 is a flow chart illustrating a search method according to an embodiment of the present invention.

Figure 3:
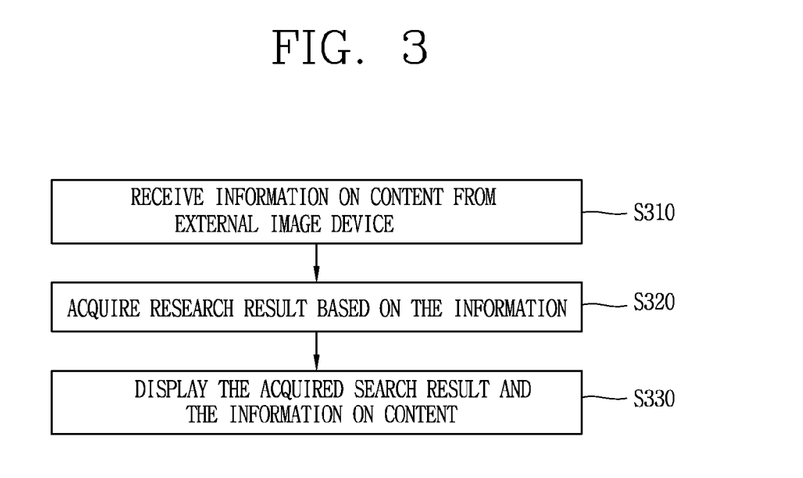
FIG. 3 is a flow chart illustrating a search method according to an embodiment of the present invention.

As illustrated in FIG. 3, according to an embodiment of the present invention, the mobile device 100 can receive information on a content from the external image device 200 based on a search request for the content being reproduced in the external image device 200 (S310). Further, the search request for a content being reproduced in the image device 200 may be entered through a user input unit of the image device 200.

Alternatively, the search request for a content being reproduced in the image device 200 may be entered through the user input unit 130 of the mobile device 100. At this time, the mobile device 100 may transmit a search request for the content to the image device 200.

On the other hand, a search request entered to the image device 200 may include timing information at which the search request is input. The information on the content may be determined based on the timing information. For instance, an image, a sound, or the like, corresponding to the timing information may be determined.

Figure 4:
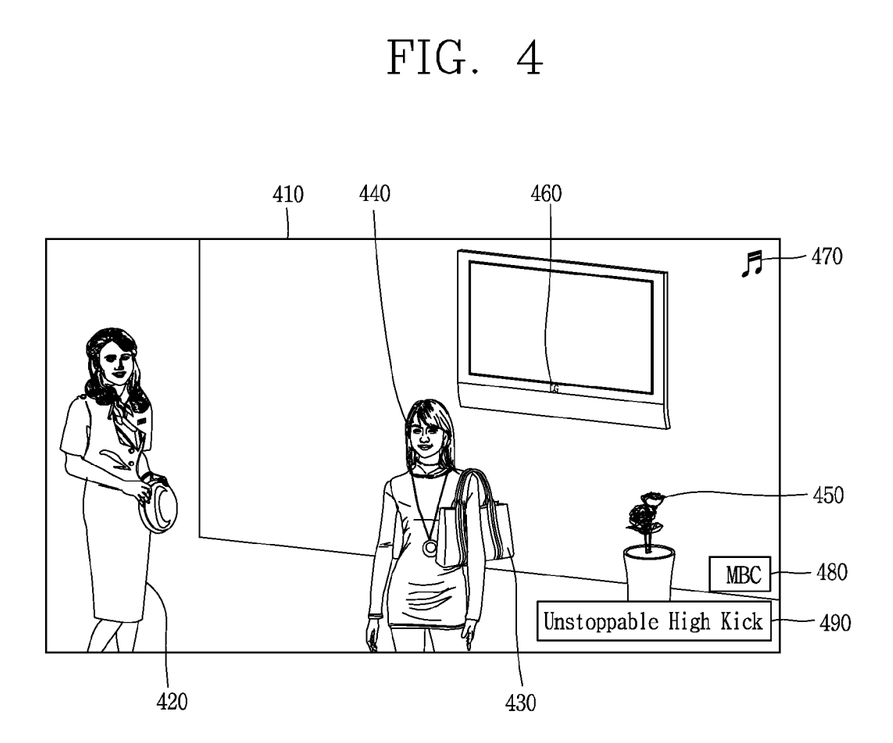
FIG. 4 is a view illustrating an example of the process illustrated in FIG. 3.

Hereinafter, through FIGS. 4 and 5, information that the mobile device 100 can receive from the external image device 200 will be described. In particular, FIG. 4 is a view illustrating an image captured by the image device 200 at a predetermined timing being reproduced with a content.

At this time, information on the content may include an image 410 captured at a predetermined timing, an identifiable object 420, 430, 440, 450, 460 contained in the image, a sound 470, a meta data 480, 490 for the content, etc. The meta data, which is information for a program, may include a content providing broadcast station, a content title, and the like. However, though information such as sound 470, meta data 480, 490, and the like are not actually displayed on the captured screen, they are displayed in the figures to help the understanding of the present invention. When the mobile device 100 receives information on the content from the image device 200, the foregoing content can be converted into data to be received.

Figure 5:
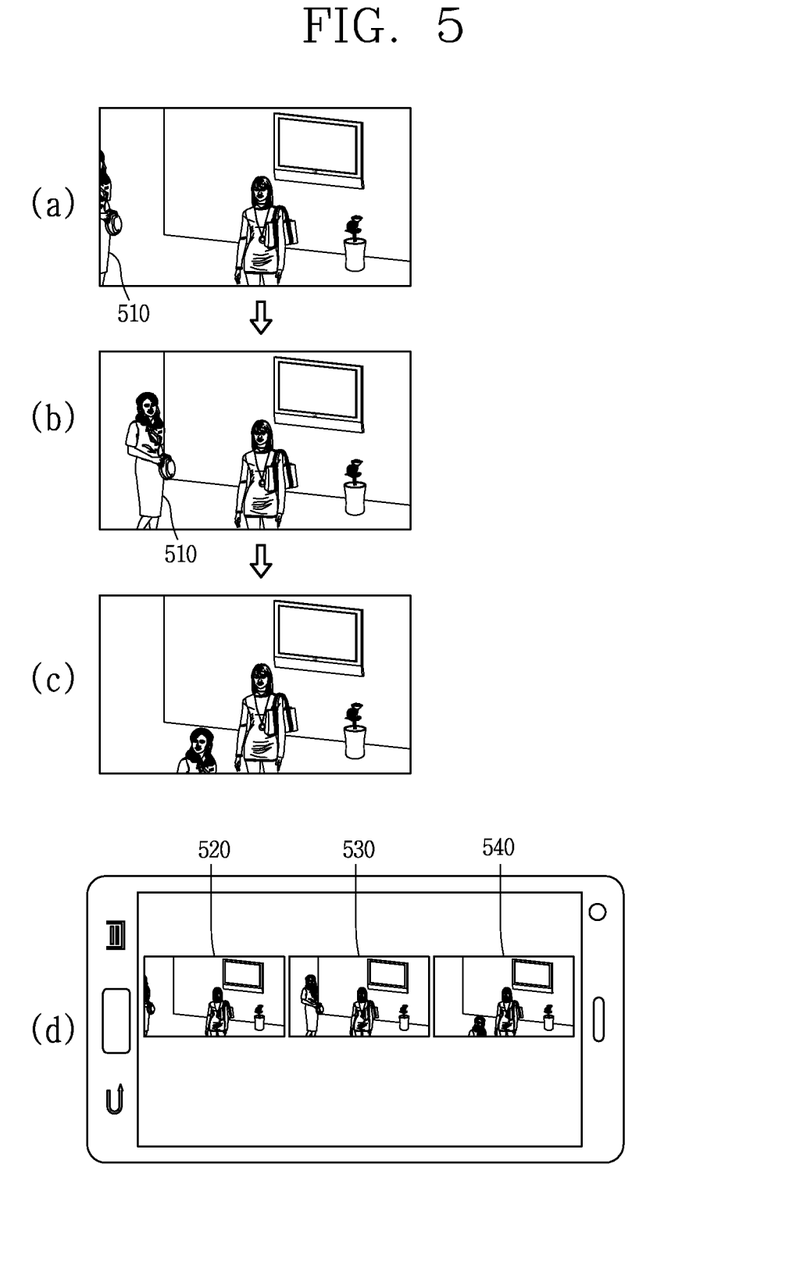
FIG. 5 is a view illustrating an example of the process illustrated in FIG. 3.

Next, FIG. 5 is a view illustrating an image captured by the image device 200 at timings with regular intervals prior to or subsequent to a predetermined timing. In particular, FIG. 5(*a*) illustrates an image captured at a first timing, FIG. 5(*b*) illustrates an image captured at a second timing, and FIG. 5(*c*) illustrates an image captured at a third timing.

The mobile device 100 can also receive information on a content corresponding to a timing at which the search request is input. However, there may occur a difference between a timing at which the user actually enters a search request and a timing recognized by the image device 200. For instance, the above difference may occur due to a data transmission time or the like. Also, the user's intended timing may be different from a timing at which the user's search request is input.

Referring to FIGS. 5(*a*)-5(*c*), when an image is being reproduced in the sequence shown, an object desired by the user to be searched is correctly displayed on an image captured at the second timing.

In this instance, the user may enter a search request through the user input unit of the external image device 200 and the user input unit 130 of the mobile device 100.

However, even if the user correctly enters a search request at the second timing, the search request for the second timing may not be recognized by a time for transmitting the request from the mobile device 100 to the image device 200. Otherwise, even if the user enters a search request while viewing the screen at the second timing, a timing actually input to the user input unit may be a third timing.

Accordingly, it is preferable to receive information on the content acquired at regular intervals prior to or subsequent to a timing at which the search request is input. For instance, referring to FIG. 5, even if a search request is input at the second timing, the mobile device 100 can receive information on a content corresponding to the first timing, second timing, and third timing.

In this manner, the mobile device 100 can receive images captured at the image device 200 at timings with regular time intervals prior to or subsequent to a predetermined timing. At this time, during the displaying step, the user may select information on the content including an object desired to be searched among the received information on the content Referring to FIG. 5(d), information 520, 530, and 540 on the content at least one or more timings may be displayed during the displaying step. Then, the user may select at least one of the information on the displayed content. In this manner, the right of selecting a frame may be provided to the user, thereby facilitating the user's search. FIG. 5 illustrates the information 520, 530, and 540 being displayed on the mobile device 100.

Also, as shown in FIG. 3, according to an embodiment of the present invention, it is possible to acquire a search result based on the information of the content (S320). In particular, FIG. 6 is a view illustrating the details of information on a content.

The details of information on the content may be searched by using a search site or the like on the Internet. Otherwise, the data may be used when the data for the details of information on the content is contained in the content.

Figure 6:
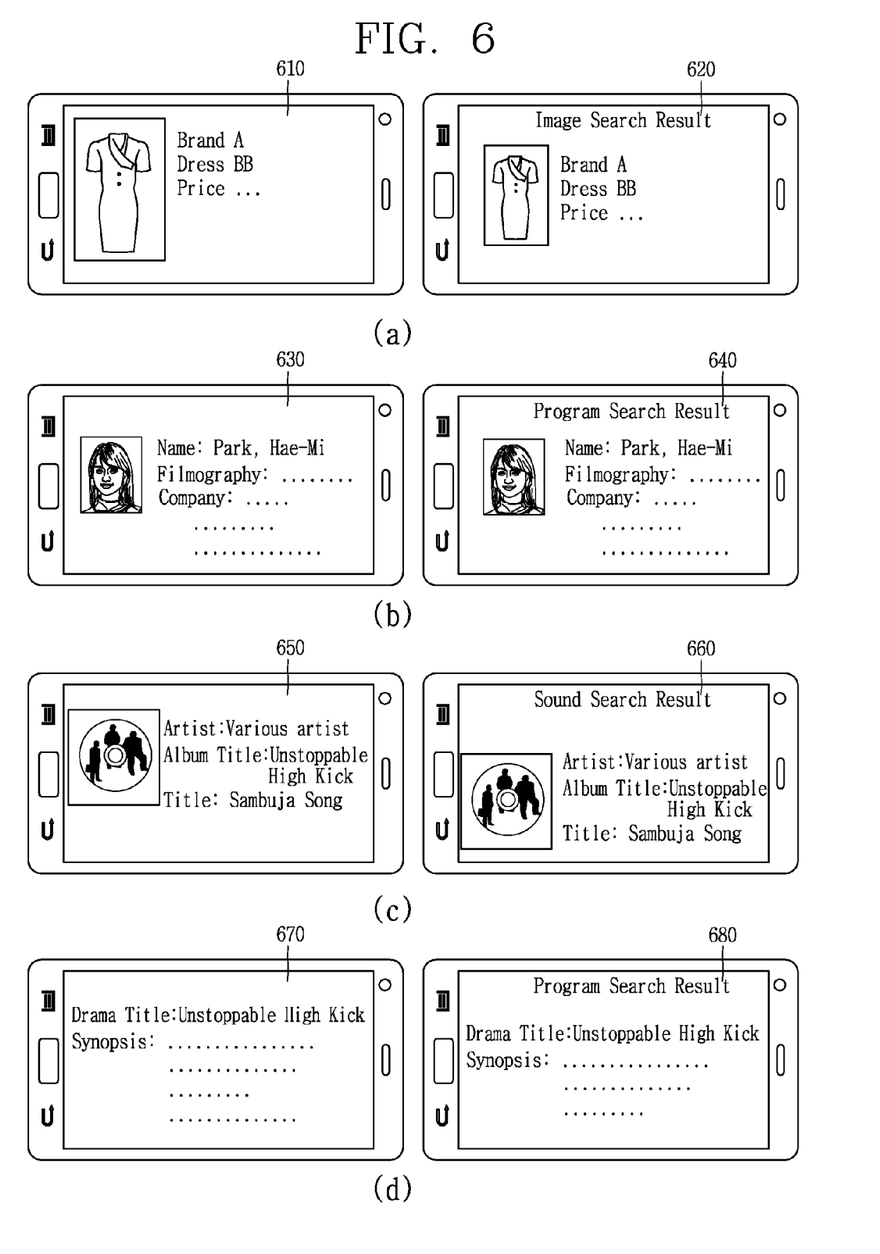
FIG. 6 is a view illustrating an example of the process illustrated in FIG. 3.

FIG. 6(a) is a view illustrating a search result for an object (body) 420 included in FIG. 4. As illustrated in FIG. 6(a), when information on the object (body) 420 is contained in the content, the mobile device 100 can acquire the details of information 610 on the object 420 using the information. Otherwise, the mobile device 100 can acquire an Internet search result 620 for the object 420 or the like using an image search function or the like on the Internet. For instance, the information 610 or search result 620 may include a product name of the object 420, a product brand, price information, and the like.

Next, FIG. 6(b) is a view illustrating a search result for an object 440 included in FIG. 4. As illustrated in FIG. 6(b), when information on the object 440 is contained in the content, the mobile device 100 can acquire the details of information 630 on the object 440 using the information. Otherwise, the mobile device 100 can acquire an Internet search result 640 or the like for the object 440 using a figure search function or the like on the Internet. For instance, the information 630 or search result 640 may include a name of the object (FIG. 440, a position, an activity, and the like.

Next, FIG. 6(c) is a view illustrating a search result for an object (music) 470 included in FIG. 4. As illustrated in FIG. 6(c), when information on the object 470 is contained in the content, the mobile device 100 can acquire the details of information 650 on the object 470 using the information. Otherwise, the mobile device 100 can acquire an Internet search result 660 or the like for the object 470 using an sound search function or the like on the Internet. For instance, the information 650 or search result 660 may include a title of the object (music) 470, an album including the music, a musician playing the music, and the like.

FIG. 6(d) is a view illustrating a search result for meta data (broadcast program title) 490 included in FIG. 4. As illustrated in FIG. 6(d), when the details of information on the meta data 490 is contained in the content, the mobile device 100 can acquire the details of information 670 on the meta data 490 using the information. Otherwise, the mobile device 100 can acquire an Internet search result 680 or the like for the meta data 490 using an broadcast program search function or the like on the Internet. For instance, the information 670 or search result 680 may include a synopsis of the meta data (broadcast program title) 490, a cast, and the like.

When the details of information on the content is searched by using a search site or the like on the Internet, the external image device 200 or the mobile device 100 may perform the search operation. At this time, when the image device 200 performs the search, the mobile device 100 can receive the search result from the external image device 200. Furthermore, the mobile device 100 can receive information on the content and a search result based on the content information at the same time.

Also, the external image device 200 or the mobile device 100 may perform the search operation, and when the Internet connection of either one thereof is unstable, the other one may perform Internet search.

Meanwhile, as shown in FIG. 3, according to an embodiment of the present invention, the acquired search result and information on the content may be displayed on the display unit 151 (S330).

Next, the method of allowing the mobile device 100 to display information on the content and a search result based on the information will be described. In particular, FIG. 7 is a view illustrating the method of allowing the mobile device 100 to display information on the content and a search result based on the information. For instance, a method of displaying information on the content illustrated in FIG. 4, and a search result illustrated in FIG. 6 will be described.

Figure 7A:
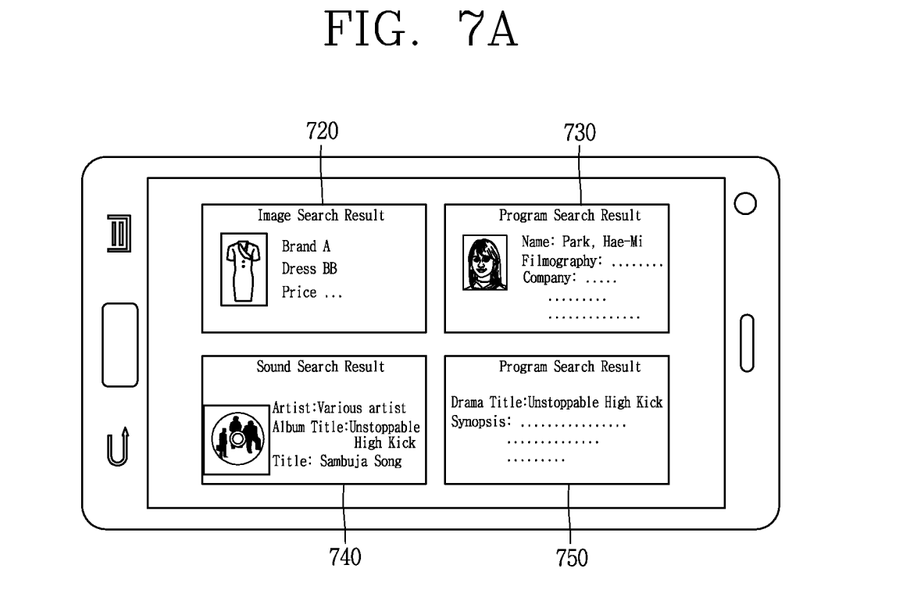
FIG. 7 is a view illustrating an example of the process illustrated in FIG. 3.

As illustrated in FIG. 7A, the mobile device 100 can display search results 720, 730, 740, and 750. At this time, not only a search result for a frame captured at a predetermined timing but also search results for frames captured at regular time intervals prior to and subsequent to the timing will be described.

Figure 7B:
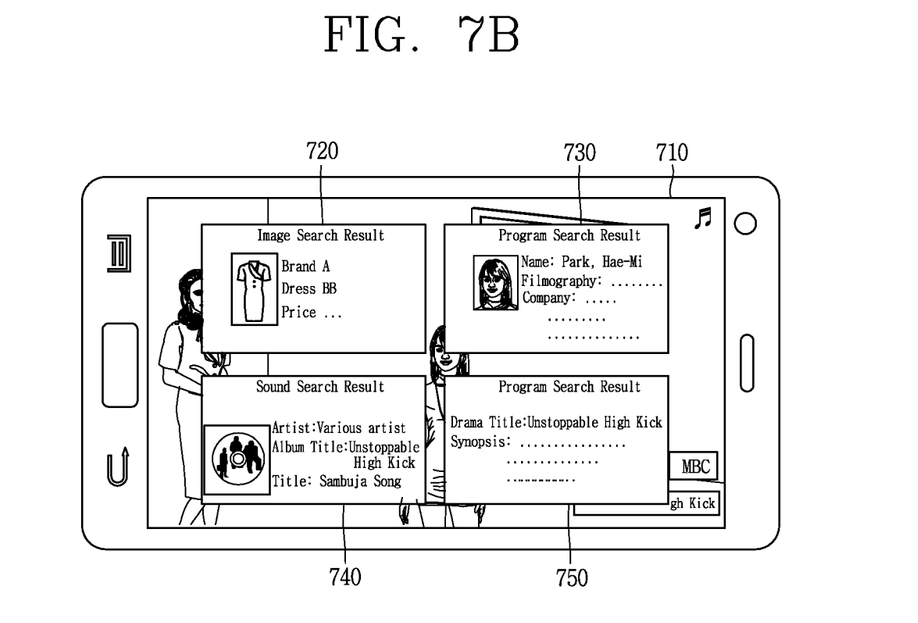

Furthermore, as illustrated in FIG. 7B, the mobile device 100 can display information 710 on the content and search results 720, 730, 740, and 750. At this time, not only content information and a search result for a frame captured at a predetermined timing but also content information and search results for frames captured at regular time intervals prior to and subsequent to the timing will be described. When the information 710 on the content and search results 720, 730, 740, and 750 are displayed at the same time, objects contained in the frame may be checked for each captured frame.

Figure 7C:
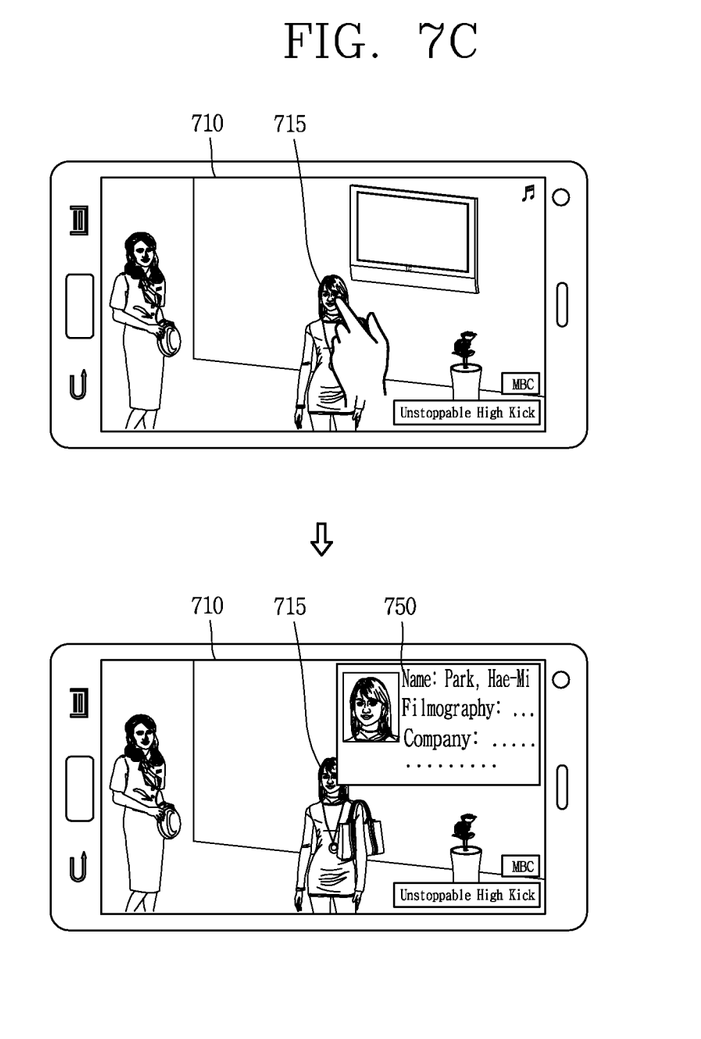

Furthermore, as illustrated in FIG. 7C, the mobile device 100 may display information 710 on the content. At this time, the user can select an object or meta data desired to check the search result among objects and meta data contained in an image being displayed on the display unit 151. Referring to FIG. 7C, the object (figure) 715 has been selected by the user's touch input. Based on the selection, the controller 180 can display the search result 750 corresponding to the object 715. The information 710 displayed on the mobile device 100 can be the same or similar content being reproduced on the external device 200. The information 700 can also be displayed in a sub-window on the mobile terminal.

As described above, for a content being reproduced in the external image device 200, a search result for the content may be checked by using the mobile device 100. As a result, when multiple persons are viewing the image device, it is possible to search a content being reproduced in the image device 200 while not disturbing the viewing of other viewers. The selection for an object being displayed on the image device 200 is also facilitated by using a mobile device.

Figure 8:
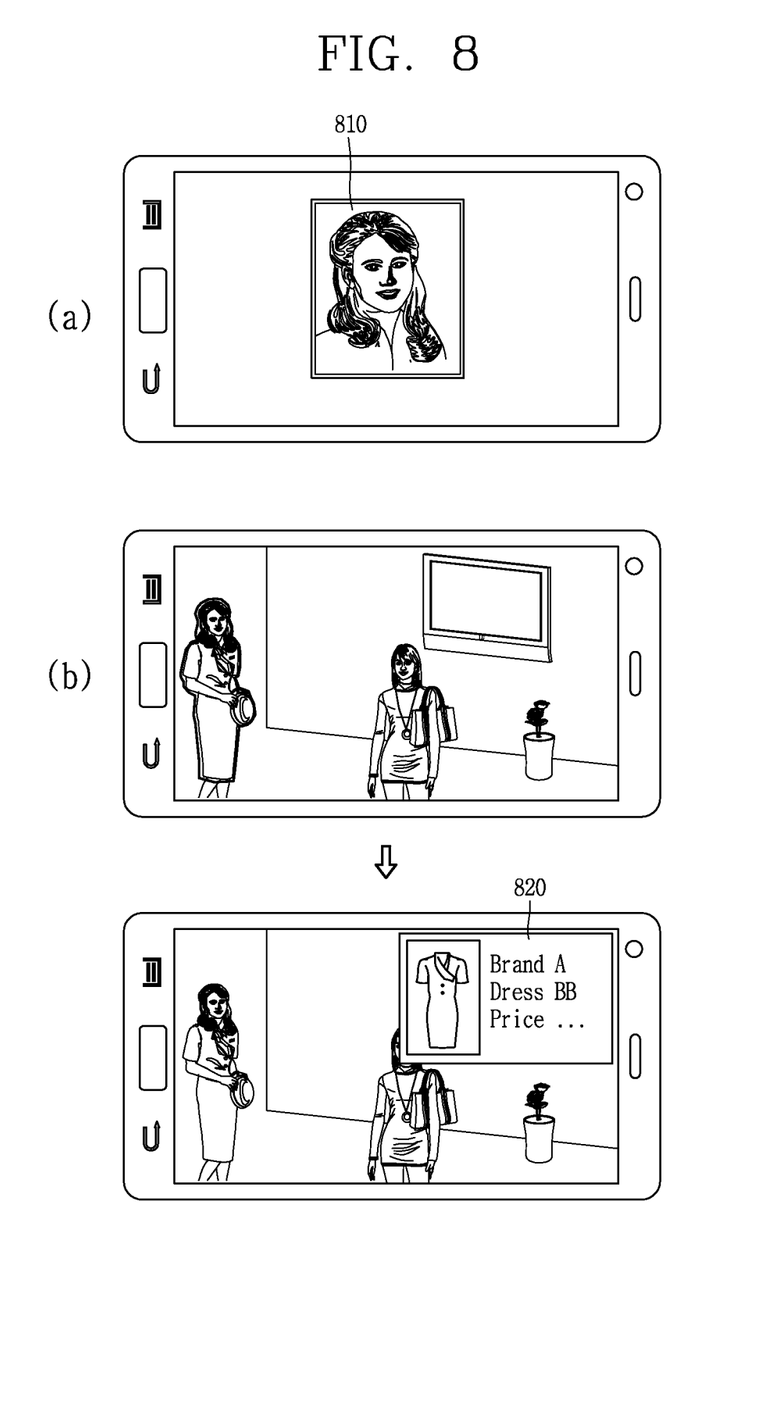
FIG. 8 is a view illustrating an example of the process illustrated in FIG. 3.

Next, FIG. 8 is a view illustrating the method of displaying information associated with the object when an object of interest has been stored. The user can store an object of interest in the memory 160 through the user input unit 130. At this time, when information on the content contains the object, a search result associated with the object may be displayed.

For instance, referring to FIG. 8(a), when the user has an interest in a specific figure, the user can enter information on the FIG. 810 in the mobile device 100. As illustrated in FIG. 8(b), when the information contains the FIG. 810 upon receiving information on the content, the mobile device 100 may be set to display information 820 associated with the figure.

For instance, the mobile device 100 can display information on a dress 820, a bag, and the like, which are worn by the FIG. 810. Thus, the user can easily and quickly acquire information associated with an object of interest based on the foregoing configuration.

The foregoing methods according to the present invention may be used in a separate manner or combined manner from or with one another. Furthermore, the steps constituting each embodiment may be used in a separate manner or combined manner from or with the steps constituting another embodiment. Also, the methods described herein may be implemented in a computer-readable medium using, for example, software, hardware, or some combination thereof.

For a hardware implementation, the embodiments described herein may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, and other electronic units designed to perform the functions described herein.

For a software implementation, procedures and functions described herein may be implemented with separate software modules. The software modules can be implemented with software codes written in a suitable programming language. Also, the software codes may be stored in the storage unit and executed by the processor.

Although the preferred embodiments of the present invention have been described in detail, the rights scope of the present invention is not limited to the embodiments and various modifications and improvements thereto made by those skilled in the art using the basic concept of the present invention as defined in the accompanying claims will fall in the rights scope of the invention.

What is claimed is:

1. A method of controlling a mobile device, the method comprising:
   wirelessly communicating, via a wireless communication unit of the mobile terminal, with an external reproduction device reproducing content on a display of the reproduction device;
   inputting, via an input unit of the mobile terminal, a search request requesting information about at least one item identifiable in the reproducing content, wherein the input search request includes timing information including a timing at which the search request is input;
   controlling, via the controller of the mobile terminal, the external reproducing device to transmit image information to the mobile terminal, wherein the image information includes an image captured before the timing at which the search request is input, an image captured at the timing the search request is input, and an image captured after the time at which the search request is input;
   displaying, on the display unit of the mobile terminal, only the captured images before, at and after the timing at which the search request is input;
   selecting, via the input unit, one of the images captured before, at and after the timing at which the search request is input;
   searching, via a controller of the mobile terminal, said selected one of the images for the information about said at least one item;
   displaying, on a display unit of the mobile terminal, the information found during the search;
   storing at least a user-specified item in a memory associated with the mobile terminal;
   searching if the stored user-specified item is displayed on the external reproducing device when the content is reproduced on the external reproducing device; and
   searching for information about the stored user-specified item and displaying said information about the stored user-specific item on the display unit when the stored user-specified item is displayed on the external reproducing device.

2. The method of claim 1, wherein the identifiable at least one item includes at least one of an identifiable object, a sound being output with the content being reproduced, and metadata associated with the content being reproduced.

3. The method of claim 2, wherein the identifiable object includes at least one of a person or outfit being worn by the person in the reproduced content.

4. The method of claim 3, wherein the searching step searches for detailed information about the identifiable object including a price and a brand of the outfit worn by the person, detailed information about the sound being output including a title and artist of the sound being output, and detailed information corresponding to metadata associated with the content being reproduced including a title and summary of the content being reproduced.

5. The method of claim 1, further comprising:
   displaying, on the display unit of the mobile terminal, the same content being reproduced on the display of the external reproduction device; and
   inputting the search request by touching said at least one item identifiable in the content being displayed on the display unit of the mobile terminal.

6. The method of claim 1, wherein the displaying step displays the information found during the search as on overlay overlaying content being displayed on the mobile terminal.

7. A mobile device, comprising:
   a wireless communication unit configured to wirelessly communicate with an external reproduction device reproducing content on a display of the reproduction device;
   a display unit;
   an input unit configured to input a search request requesting information about at least one item identifiable in the reproducing content, wherein the input search request includes timing information including a time at which the search request is input;
   a controller configured to:
   control the external reproducing device to transmit image information to the mobile terminal, wherein the image information includes an image captured before the timing at which the search request is input, an image captured at the timing the search request is input, and an image captured after the timing at which the search request is input,
   display only the captured images before, at and after the timing at which the search request is input on the display unit,
   receive a selection of one of the images captured before, at and after the timing at which the search request is input,
   search said selected one of the images for the information about said at least one item, and
   display the information found during the search on the display unit; and
   a memory configured to store at least a user-specified item, wherein the controller is further configured to search if the stored user-specified item is displayed on the external reproducing device when the content is reproduced on the external reproducing device, search for information about the stored user-specified item, and display said information about the stored user-specified item on the display unit when the stored user-specified item is displayed on the external reproducing device.

8. The mobile device of claim 7, wherein the identifiable at least one item includes at least one of an identifiable object, a sound being output with the content being reproduced, and metadata associated with the content being reproduced.

9. The mobile device of claim 8, wherein the identifiable object includes at least one of a person or outfit being worn by the person in the reproduced content.

10. The mobile device of claim 9, wherein the controller is further configured to search for detailed information about the identifiable object including a price and a brand of the outfit worn by the person, detailed information about the sound being output including a title and artist of the sound being output, and detailed information corresponding to metadata associated with the content being reproduced including a title and summary of the content being reproduced.

11. The mobile device of claim 7, wherein the display unit is further configured to display the same content being reproduced on the display of the external reproduction device, and
wherein the input unit is further configured to receive a selection signal indicating a touching of said at least one item identifiable in the displayed content to correspond to the search request.

12. The mobile device of claim 7, wherein the displaying unit is further configured to display the information found during the search as on overlay overlaying content being displayed on the mobile terminal.

* * * * *